(12) United States Patent
Chen

(10) Patent No.: US 8,537,560 B2
(45) Date of Patent: Sep. 17, 2013

(54) ELECTRONIC DEVICE

(75) Inventor: Li-Ping Chen, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 386 days.

(21) Appl. No.: 13/048,526

(22) Filed: Mar. 15, 2011

(65) Prior Publication Data

US 2012/0051010 A1  Mar. 1, 2012

(30) Foreign Application Priority Data

Aug. 30, 2010  (CN) .......................... 2010 1 0266720

(51) Int. Cl.
*H05K 5/00* (2006.01)
(52) U.S. Cl.
USPC ............................ 361/752; 361/730; 361/796
(58) Field of Classification Search
USPC ................. 361/724–730, 752, 796, 807, 809, 361/810
See application file for complete search history.

(56) References Cited

U.S. PATENT DOCUMENTS

| | | | | |
|---|---|---|---|---|
| 5,045,960 A * | 9/1991 | Eding | ......................... | 360/99.15 |
| 5,325,263 A * | 6/1994 | Singer et al. | ............. | 361/679.39 |
| 5,721,669 A * | 2/1998 | Becker et al. | ............ | 361/679.31 |
| 5,784,644 A * | 7/1998 | Larabell | ............................ | 710/9 |
| 6,560,099 B1 * | 5/2003 | Chang | ......................... | 361/679.4 |
| 6,831,837 B2 * | 12/2004 | Chang | ........................... | 361/715 |
| 7,248,468 B1 * | 7/2007 | Hsu | ......................... | 361/679.33 |
| 8,289,693 B2 * | 10/2012 | Li | ............................ | 361/679.34 |

* cited by examiner

*Primary Examiner* — Hung S Bui
(74) *Attorney, Agent, or Firm* — Altis Law Group, Inc.

(57) ABSTRACT

An electronic device includes a chassis, a receiving tray received in the chassis, a drive bracket slidably received in the receiving tray, and a connecting assembly. The receiving tray includes a first clasping portion, and a first circuit board is located in the receiving tray. A storage device is received in the drive bracket. The storage device is electronically connected to the circuit board. The connecting assembly includes a flexible cable electronically connected to the first circuit board and a mounting member. A first extending piece is located on the mounting member. The first extending piece is clipped to the first clasping portion, and the mounting member is attached to the flexible cable.

15 Claims, 6 Drawing Sheets

ELECTRONIC DEVICE

BACKGROUND

1. Technical Field

The present disclosure relates to electronic devices, more particularly an electronic device with a storage device.

2. Description of Related Art

In most cases, a first connector on a storage device is electronically connected to a backboard with a cable. The cable is electronically connected to the second connector plugged into a motherboard. The backboard is usually secured to a mounting tray with some screws. It is labor intensive and time-consuming for securing the backboard.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
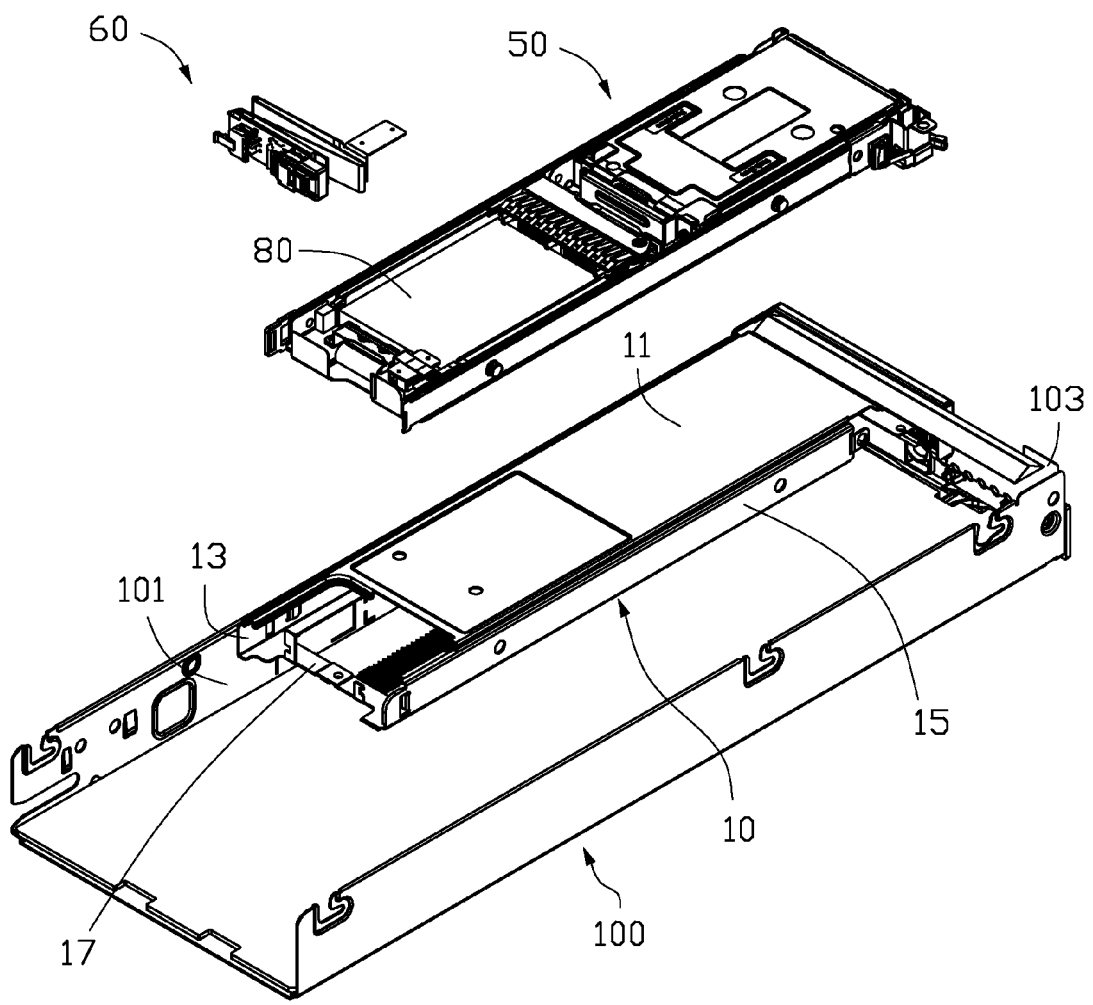
FIG. 1 is an exploded, isometric view of an electronic device in accordance with an embodiment.

Referring to FIG. 1, an electronic device, in accordance with an embodiment includes a chassis 100, a receiving tray 10 attached to the chassis 100, and a drive bracket 50. The drive bracket 50 is configured for securing a storage device 80.

The chassis 100 includes a chassis bottom wall 102, two chassis sidewalls 101 connected to opposite edges of the chassis bottom wall 102, and a chassis rear wall 103 located between the two chassis sidewalls 101. In one embodiment, the chassis rear wall 103 is perpendicular to both the chassis bottom wall 102 and the chassis sidewalls 101.

The receiving tray 10 includes a bottom plate 17, a first side plate 13 adjacent one of the two chassis sidewalls 101, a second side plate 15 substantially parallel to the first side plate 13, and a top plate 11 substantially parallel to the bottom plate 17. In one embodiment, the second side plate 15 is attached to the chassis rear wall 103.

Figure 2:
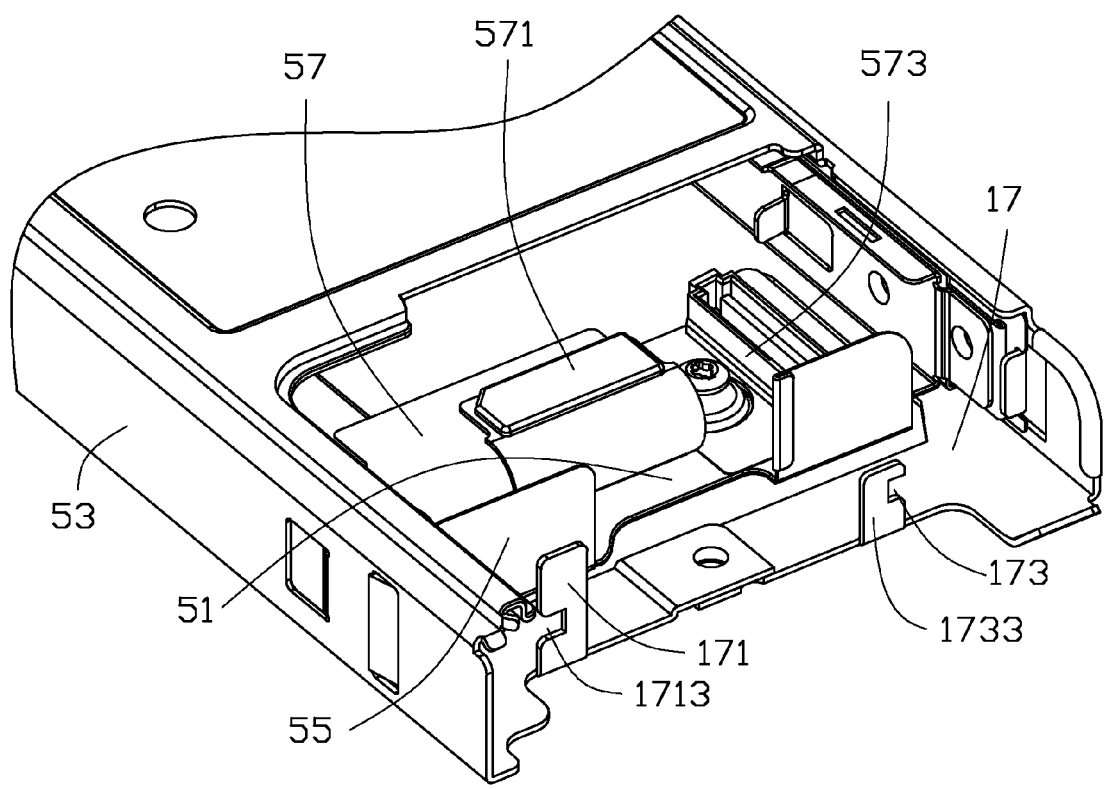
FIG. 2 is an isometric, cutaway of a drive bracket of the electronic device in accordance with an embodiment.
Figure 3:
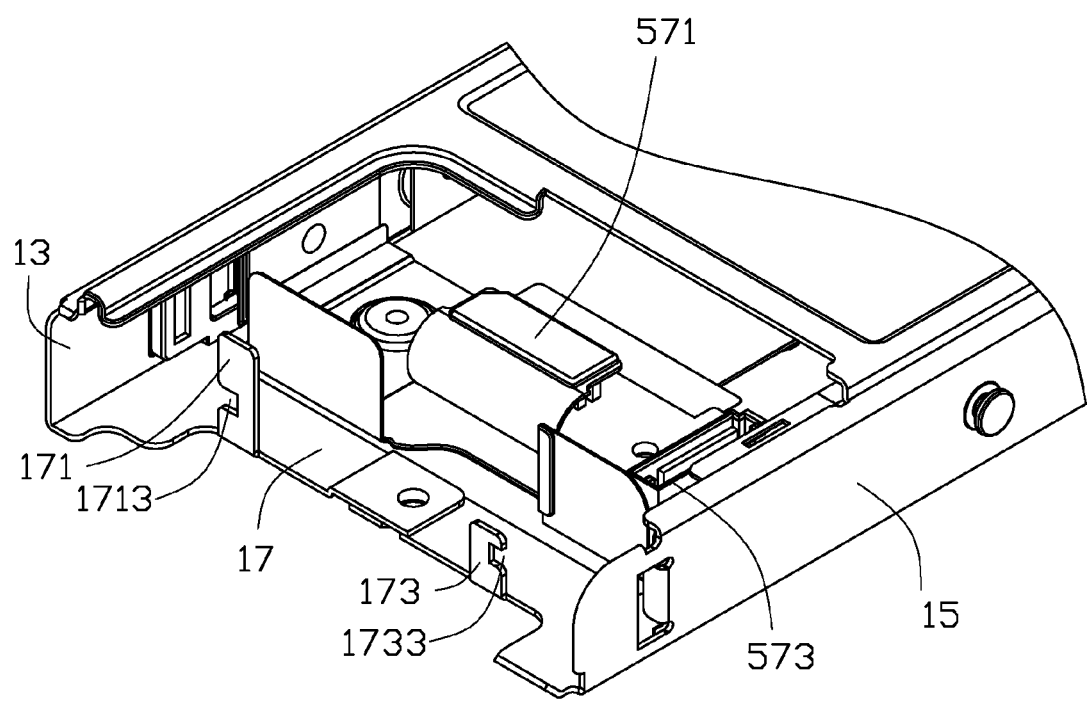
FIG. 3 is similar to FIG. 2, but viewed from a different aspect.

Referring to FIGS. 2-3, a first clasping portion 171 and a second clasping portion 173 are located on the bottom plate 17. A first clasping slot 1713 is defined in the first clasping portion 171, and a second clasping slot 1733 is defined in the second clasping portion 173. In one embodiment, the first and second clasping portions 171, 173 are substantially perpendicular to the bottom plate 17.

The drive bracket 50 is slidably received in the receiving tray 10, and includes a bottom panel 51 and two side panels 53 connected to opposite edges of the bottom panel 51. Two retaining pieces 55 are located on the bottom panel 51 and adjacent the first and second clasping portions 171, 173. A first circuit board 57 is disposed on the bottom panel 51. A first connector 571 and a second connector 573 are electronically connected to the first circuit board 57. The first connector 571 is configured to connect with the storage device 80, and the second connector 573 is configured to connect with a connecting assembly 60 (see FIG. 1).

Figure 4:
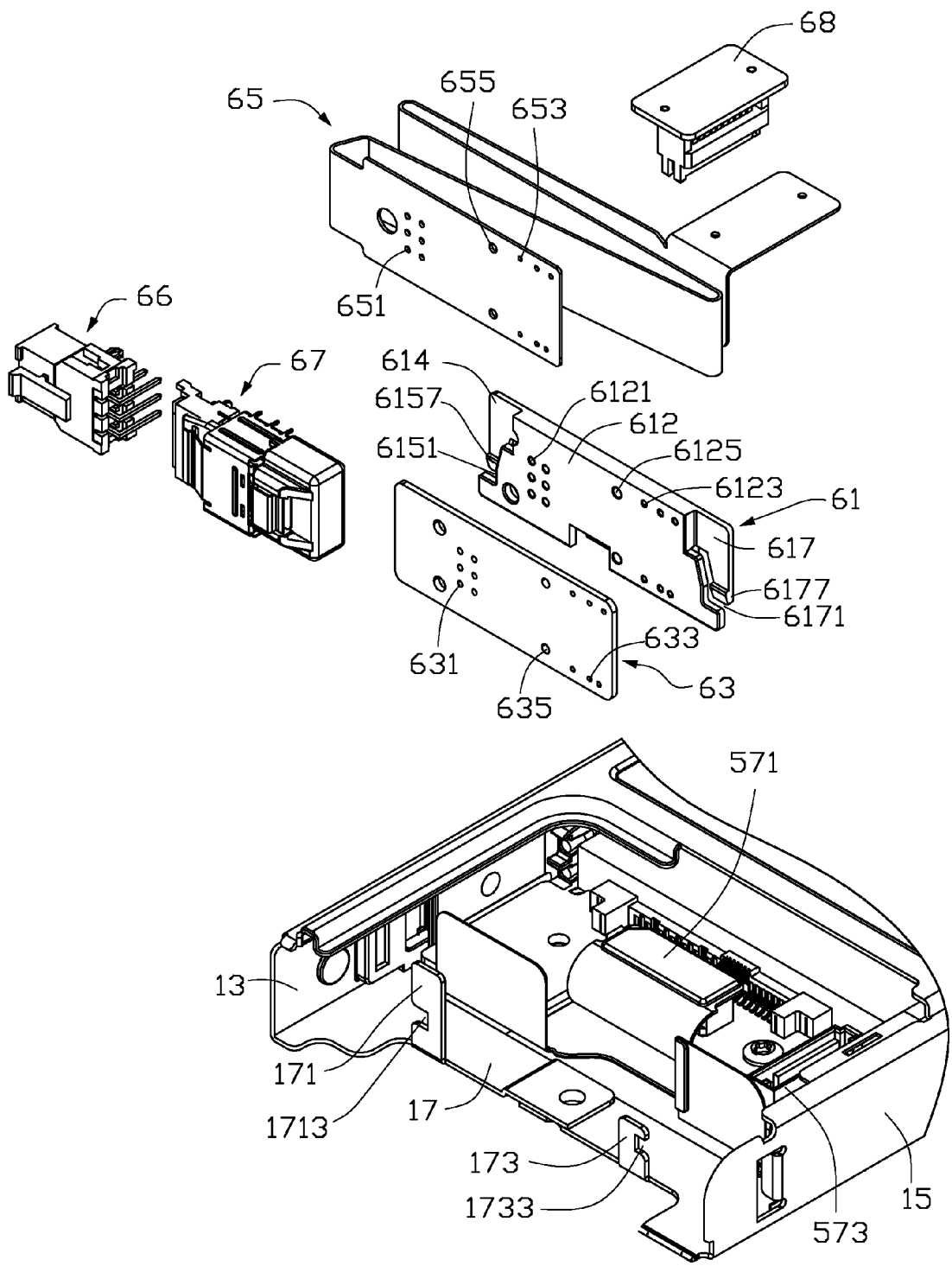
FIG. 4 is an exploded, cutaway view of a receiving tray and a connecting assembly of the electronic device in accordance with an embodiment.
Figure 5:
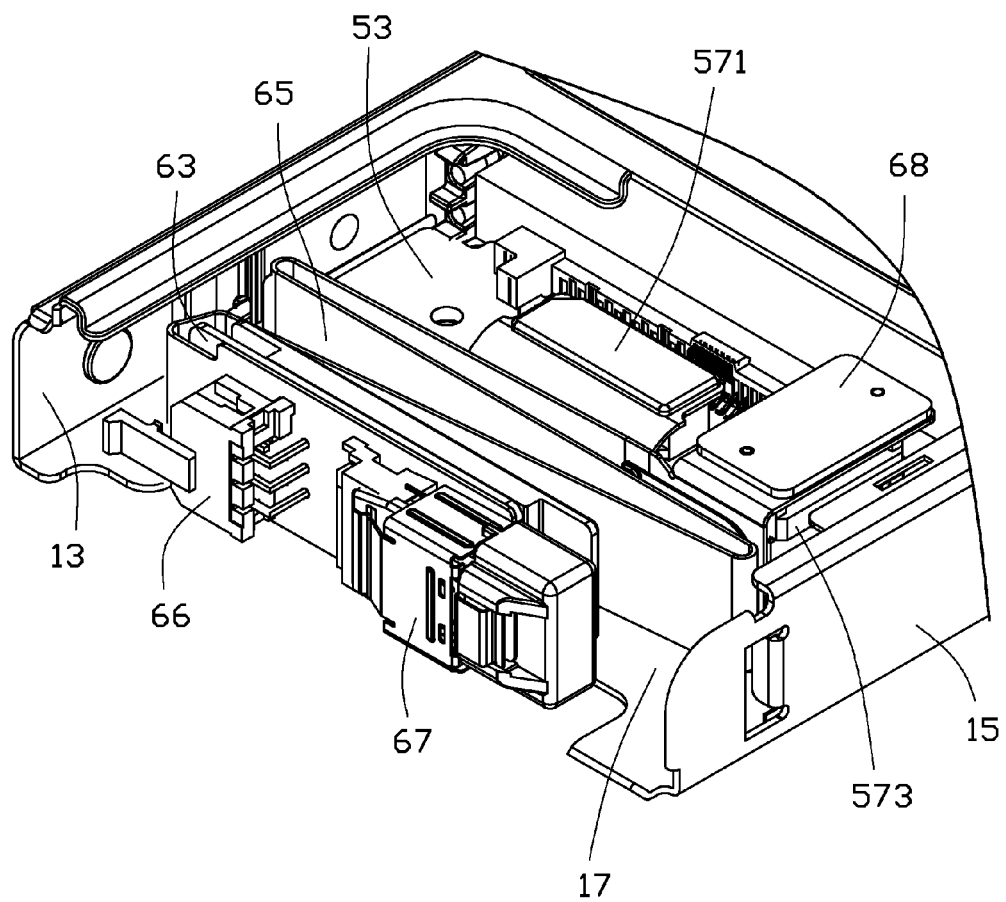
FIG. 5 is an assembled view of FIG. 4.

Referring to FIGS. 4-5, the connecting assembly 60 includes a mounting member 61, a second circuit board 63, a flexible cable 65, a third connector 66, a fourth connector 67 and a fifth connector 68. The fifth connector 68 is secured to the flexible cable 65 and configured to be electronically connected to the second connector 573 of the first circuit board 57 (see FIG. 5).

The mounting member 61 includes a front plate 612, a first extending piece 614 located the back of a first end of the front plate 612, and a second extending piece 617 located on the back of a second end of the front plate 612. The first and second extending pieces 614, 617 are elastic, and substantially parallel to the front plate 612. A first accommodating slot 6151 is defined between the first extending piece 614 and the front plate 612, for receiving the first clasping portion 171. A second accommodating slot 6171 is located between the second extending piece 617 and the font plate 612, for receiving the second clasping portion 173. A first block 6157 protrudes from a free end of the first extending piece 614 and is located in the first accommodating slot 6151. A second block 6177 protrudes from a free end of the second extending piece 617 and is located in the second accommodating slot 6171. The first block 6157 is used to clip into the first clasping slot 1713 of the first clasping portion 171, and the second block 6177 is used to clip into the second clasping slot 1733 of the second clasping portion 173. A plurality of first connecting holes 6121, a plurality of second connecting holes 6123, and two securing holes 6125 are defined in the front plate 612.

A plurality of first inserting holes 631, a plurality of second inserting holes 633 and two mounting holes 635 are defined in the second circuit board 63. A plurality of first retaining holes 651, a plurality of second retaining holes 653 and two fixing holes 655 are defined in the flexible cable 65. The plurality of first retaining holes 651 corresponds to the plurality of first connecting holes 6121 and the plurality of first inserting holes 631. The plurality of second retaining holes 653 corresponds to the plurality of second connecting holes 6123 and the plurality of second inserting holes 633. The two fixing holes 655 correspond to the two mounting holes 635 and the two securing holes 6125.

Figure 6:
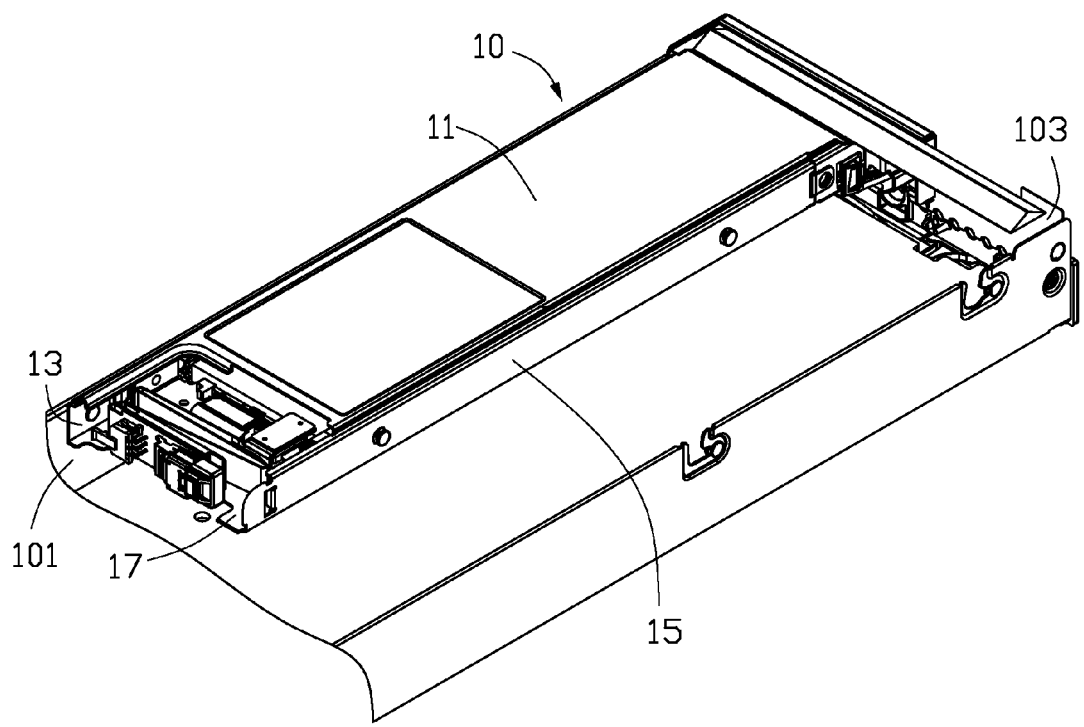
FIG. 6 is an assembled, cutaway view of FIG. 1.

Referring to FIGS. 4-6, in assembly, the receiving tray 10 is received in the chassis 100. The drive bracket 50 is slidably received in the receiving tray 10.

The second circuit board 63 abuts the front plate 612 of the mounting member 61, and the flexible cable 65 abuts the second circuit board 63 (shown in FIG. 5). The two fixing holes 655, the two mounting holes 635 and the two securing holes 6125 are aligned together. Two fastening members (not shown) are screwed into the two fixing holes 655, the two mounting holes 635 and the two securing holes 6125. Thus, the flexible cable 65, the second circuit board 63 and the mounting member 61 are mounted together. Then, the plurality of first retaining holes 651 is aligned with the plurality of first inserting holes 631 and the plurality of first connecting holes 6121, and the plurality of second retaining holes 653 are aligned with the plurality of second inserting holes 633 and the plurality of second connecting holes 6123.

The mounting member 61 is moved in a first direction towards the bottom plate 17 of the receiving tray 10. The first clasping portion 171 is received in the first accommodating slot 6151 and abuts the first block 6157 of the mounting member 61. The second clasping portion 173 is received in the second accommodating slot 6171 and abuts the second block 6177 of the mounting member 61. The mounting member 61 is moved further, and the first and second extending pieces 614, 617 are deformed away from the first and second clasping portions 171, 173, until the first and second blocks 6157, 6177 are clipped into the first and second clasping slots 1713, 1733. Therefore, the mounting member 61 is secured to the bottom plate 17.

The third connector 66 is inserted into the plurality of first retaining holes 651, the plurality of first inserting holes 631, and the plurality of first connecting holes 6121. The fourth connector 67 is inserted into the plurality of second retaining holes 653, the plurality of second inserting holes 633 and the plurality of second connecting holes 6123. The fifth connector 68 is inserted into the second connector 573.

In use, a signal from the storage device 80 is transmitted to the first circuit board 57 via the first connector 571, and the signal further transmits to the flexible cable 65 via the fifth connector 68. Then, the signal can be transmitted to the third connector 66 and the fourth connector 67 from the flexible cable 65. Therefore, the signal can be transmitted between the third and fourth connectors 66, 67 and the flexible cable 65.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
    a chassis;
    a receiving tray, received in the chassis, comprising a first clasping portion;
    a first circuit board located in the receiving tray;
    a drive bracket, slidably received in the receiving tray, configured to secure a storage device that is capable of being connected to the first circuit board; and
    a connecting assembly comprising a flexible cable and a mounting member attached to the flexible cable, the flexible cable is electronically connected to the first circuit board, a first extending piece is located on the mounting member and clipped to the first clasping portion.

2. The electronic device of claim 1, wherein the receiving tray comprises a bottom plate, and the first clasping portion is substantially perpendicular to the bottom plate.

3. The electronic device of claim 1, wherein the mounting member comprises a front plate, a first accommodating slot is located between the front plate and the first extending piece, and the first clasping portion is received in the first accommodating slot.

4. The electronic device of claim 1, wherein a first clasping slot is defined in the first clasping portion, a first block is located on the first extending piece, and the first block is engaged in the first clasping slot.

5. The electronic device of claim 1, wherein a first connector and a second connector are electronically connected to the first circuit board, the first connector is capable of being connected to the storage device, and the second connector is connected to the flexible cable.

6. The electronic device of claim 5, wherein the connecting assembly further comprises a second circuit board abutting the mounting member, and the flexible cable abuts the second circuit board.

7. The electronic device of claim 6, wherein the connecting assembly further comprises a third connector and a fourth connector, and the third connector and the fourth connector are electronically connected to the flexible cable, the second circuit board and the mounting member.

8. The electronic device of claim 7, wherein the connecting assembly further comprises a fifth connector, and the fifth connector is electronically connected to the flexible cable and the second connector of the first circuit board.

9. An electronic device comprising:
    a chassis;
    a receiving tray, received in the chassis, comprising a bottom plate and a first clasping portion disposed on the bottom plate, a first circuit board attached to the bottom plate, a first connector and a second connector electronically connected to the first circuit board, the first connector capable of being electronically connected to a storage device;
    a drive bracket, slidably received in the receiving tray, for securing the storage device; and
    a connecting assembly comprising a flexible cable and a mounting member, the flexible cable electronically connected to the second connector on the first circuit board, and a first accommodating slot defined in the mounting member;
    wherein the first clasping portion is received in the first accommodating slot, and the mounting member is attached to the flexible cable.

10. The electronic device of claim 9, wherein the first clasping portion is substantially perpendicular to the bottom plate.

11. The electronic device of claim 9, wherein a first extending piece is located on the mounting member, and the first extending piece is clipped to the first clasping portion.

12. The electronic device of claim 11, wherein a first clasping slot is defined in the first clasping portion, a first block is located on the first extending piece, and the first block is engaged in the first clasping slot.

13. The electronic device of claim 9, wherein the connecting assembly further comprises a second circuit board abutting the mounting member, and the flexible cable abuts the second circuit board.

14. The electronic device of claim 13, wherein the connecting assembly further comprises a third connector and a fourth connector; and the third connector and the fourth connector are electronically connected to the flexible cable, the second circuit board and the mounting member.

15. The electronic device of claim 14, wherein the connecting assembly further comprises a fifth connector, and the fifth connector is electronically connected to the flexible cable and the second connector of the first circuit board.

* * * * *